United States Patent [19]

Ostlinning et al.

[11] Patent Number: 4,786,712
[45] Date of Patent: Nov. 22, 1988

[54] PROCESS FOR THE PREPARATION OF OPTIONALLY BRANCHED POLYARYLENE SULPHIDES HAVING REDUCED CORROSIVENESS WITH KETONE DILUENT AND ORGANIC SOLVENT

[75] Inventors: Edgar Ostlinning, Duesseldorf; Karsten Idel; Rolf-Volker Meyer, both of Krefeld, all of Fed. Rep. of Germany

[73] Assignee: Bayer Aktiengesellschaft, Leverkusen, Fed. Rep. of Germany

[21] Appl. No.: 661,936

[22] Filed: Oct. 17, 1984

[30] Foreign Application Priority Data

Oct. 28, 1983 [DE] Fed. Rep. of Germany ....... 3339233

[51] Int. Cl.$^4$ ............................................. C08G 75/14
[52] U.S. Cl. .................................... 528/388; 528/492; 528/493; 528/495
[58] Field of Search ................ 528/388, 492, 493, 495

[56] References Cited

U.S. PATENT DOCUMENTS

| | | | |
|---|---|---|---|
| 3,457,242 | 7/1969 | Hill | 528/497 |
| 4,071,509 | 1/1978 | Edmonds | 528/388 |
| 4,405,767 | 9/1983 | Beever et al. | 528/388 |
| 4,451,644 | 5/1984 | Ostlinning et al. | 528/388 |
| 4,490,522 | 12/1984 | Kawabata et al. | 528/388 |

FOREIGN PATENT DOCUMENTS 1065447  4/1967  United Kingdom .

OTHER PUBLICATIONS

Robert Thornton Morrison and Robert Neilson Boyd, Organic Chemistry (Jun. 1970).
G & C Merriam Co., Webster's Third New International Dictionary of the English Language Unabridged, 1971).

Primary Examiner—Harold D. Anderson
Attorney, Agent, or Firm—Connolly and Hutz

[57] ABSTRACT

This invention relates to a process for the preparation of optionally branched polyarylene sulphides which are distinguished by their substantially lower corrosiveness.

7 Claims, No Drawings

PROCESS FOR THE PREPARATION OF OPTIONALLY BRANCHED POLYARYLENE SULPHIDES HAVING REDUCED CORROSIVENESS WITH KETONE DILUENT AND ORGANIC SOLVENT

This invention relates to a process for the preparation of optionally branched polyarylene sulphides which are distinguished by their substantially lower corrosiveness.

Polyarylene sulphides and methods for their preparation are known (see for example U.S. Pat. Nos. 2,513,188, 3,117,620, 3,354,129, 3,524,835, 3,790,536, 3,839,301, 4,038,259, 4,038,260, 4,038,261, 4,038,262, 4,056,515, 4,060,520, 4,064,114, 4,116,947, 4,282,347, DE-AS Nos. 2,453,485, 2,453,749, DE-OS Nos. 2,634,462, 2,623,333, 2,930,797, 2,930,710, 3,019,732 and 3,030,488).

Special purification processes are also known (see for example U.S. Pat. No. 4,071,509, JA-PS 57 108-135 and DE-OS No. 3,143,992).

Various procedures for working up the product have also been described (see for example U.S. Pat. No. 3,354,129, 3,457,242, 3,478,000, 3,687,907, 3,707,528, 3,839,302, 3,941,664, 3,956,060, 4,046,749, 4,178,435 and EP No. 79 144).

According to one known method, for example, the solvent in which the reaction was carried out is evaporated from the reaction mixture, and inorganic salts are subsequently washed out of the residue with water.

Alternatively, the reaction mixture may be directly introduced into water and washed without prior separation of the solvent.

It is also known to carry out an additional washing step with organic solvents such as acetone, aromatic hydrocarbons, dimethyl sulphoxide (DMSO) or N-methyl pyrrolidone (NMP).

Introduction of the reaction mixture into hydrocarbons followed by washing with water has also been described (U.S. Pat. No. 3,457,242).

It is also known to purify polyarylene sulphides by additional process steps, in particular to remove NaCl impurities (e.g. by heating in water with alkali metal acetates to temperatures just below the melting point of the polymer (DE-OS No. 3,143,992); by extraction with solvent mixtures such as N-methyl pyrrolidone with ethylene glycol (JA-PS No. 57 108-135); or by heating in organic amides in the presence of certain alkali metal salts (U.S Pat. No. 4,071,509).

Polyarylene sulphides which have been prepared by these processes all have a significant capacity to corrode, due to the liberation of acid gases when heated to temperature above 150° C.

Most of these acid gases contain sulphur, (F. Quella, Kunststoffe 71 (1981) 6 pages 386 et seq). Since acid gases are able to attack metals, polyarylene sulphides having such characteristics should not be left in contact with metals for any appreciable time at high temperatures. This is generally unavoidable, however, for example in processes of injection moulding or extrusion. Metals in parts of moulds are also attacked and these parts may eventually be destroyed.

It has now been found that these corrosive properties of polyarylene sulphides may be significantly reduced by suitable methods of working up if, during the process of preparation of the polyarylene sulphides, the reaction mixture was introduced into suitable solvents after the reaction, e.g. solvents such as alcohols or ketones or the solvent was used for the reaction.

The present invention thus provides a process for the preparation of optionally branched polyarylene sulphides from (a) 50–100 mol % of aromatic dihalogen compounds corresponding to the formula (I):

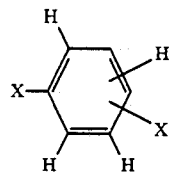

(I)

and 0–50 mol % of aromatic dihalogen compounds corresponding to the formula (II):

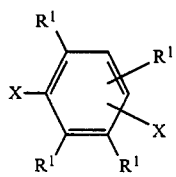

(II)

wherein

X represents halogen atoms such as chlorine or bromine in the meta or para position to each other and $R_1$ which may be idential or different, may represent hydrogen, alkyl, cycloalkyl, aryl, arkylaryl or arylalkyl, and two groups $R_1$ in the ortho position to each other may be linked together to form an aromatic or heterocyclic ring and one group $R_1$ is always other than hydrogen, and (b) 0 to 5 mol %, preferably 0.05 to 2.5 mol %, based on the sum of aromatic dihalogen compounds of formulae I and II, of an aromatic tri- or tetrahalogen compound of the formula (III):

$$ArX_n \qquad (III)$$

wherein

Ar represents an aromatic or heterocyclic group,

X represents a halogen atom such as chlorine or bromine and n represents the number 3 or 4, and (c) alkali metal sulphides, preferably sodium or potassium sulphide or mixtures thereof, preferably in the form of their hydrates or aqueous mixtures optionally together with alkali metal hydroxides such as sodium or potassium hydroxide, with the molar ratio of (a+b):c lying within the range of from 0.85:1 to 1.15:1, preferably from 0.95:1 to 1.05:1, in (d) organic solvents, preferably N-alkyl lactams or peralkylated ureas, optionally with the addition of catalysts and/or cosolvents, the molar ratio of alkali metal sulphides (c) to the organic solvent (d) lying within the range of from 1:2 to 1:15, and (e) water in the form of water of hydration or free water, the molar ratio of c : e lying within the range of from 1:0 to 1:3 and the process being carried out at a reaction temperature of 160° C. to 270° C., optionally under excess pressure, characterised in that after completion of the reaction, the reaction mixture is introduced into an organic diluent, preferably alcohols, ketones or the same solvent as that used for the reaction, and the mixture is then optionally washed.

The reaction time of the process is up to 24 hours, preferably 2 to 18 hours.

The catalyst used for this purpose may be the conventional substances used in their usual quantities, for example, alkali metal fluorides, alkali metal phosphates or alkali metal carboxylates, from 0.02 to 1.0 mol of catalyst being used per mol of alkali metal sulphide.

The cosolvents may be, for example, N,N-dialkyl carboxylic acid amides of $C_1$–$C_8$ aliphatic or $C_6$–$C_{12}$ aromatic carboxylic acids used in a quantity of 0.02 to 1.0 mol, based on 1 mol of alkali metal sulphide.

$R^1$ in formula II preferably represents a hydrogen atom $C_1$–$C_{20}$ alkyl, $C_5$–$C_{20}$ cycloalkyl, $C_6$–$C_{24}$ aryl, $C_7$–$C_{24}$ alkylaryl or $C_7$–$C_{24}$ aralkyl groups. Moreover, two groups represented by $R^1$ in the ortho position to each other may together form a condensed aromatic ring with a total of 6 carbon atoms or a condensed heterocyclic ring having 5 or 6 ring atoms and 1 to 3 hetero atoms such as N, O and S.

Ar preferably represents an aromatic group having 6 to 24 carbon atoms or a heterocyclic group having 6 to 24 ring atoms, and with particular preference an aromatic group having 6 to 10 carbon atoms or a heterocyclic group having 6 to 10 ring atoms, with the heterocyclic groups optionally containing up to 3 hetero atoms such as N, S or O.

Alkali metal sulphides are used in the conventional quantities and in the usual manner. Sodium and potassium sulphide for example, are suitable. Alkali metal sulphides which have been regenerated from hydrogen sulphides with alkali metal hydroxides such as LiOH, NaOH or KOH may be used. Both the sulphides and the hydroxides may in all cases be used as mixtures.

The aromatic dihalogen compounds of formulae (I) and (II) used according to the invention may be meta or paradihalogen compounds. In that case, the proportion of aromatic meta- to para-dihalogen compounds may be up to 30:70.

The process may be carried out at an excess pressure of up to 25 bar, preferably at a pressure of 0.0 to 18 bar.

It is preferred to use aromatic para-dihalogen compounds.

If branched chain polyarylene sulphides are to be prepared, it is necessary to use at least 0.05 mol % of an aromatic tri- or tetrahalogen compound of formula (III) and it is preferred to use 0.05 to 2.5 mol % of an aromatic tri- or tetrahalogen compound, based on the sum of aromatic dihalogen compounds.

The following are examples of aromatic dihalogen compounds of formula (I) to be used according to the invention: p-dichlorobenzene, p-dibromobenzene, 1-chloro-4-bromobenzene, 1,3-dichlorobenzene, 1,3-dibromobenzene, 1-chloro-3-bromobenzene and 1-chloro-3-bromobenzene. These may be used singly or as mixtures with each other. 1,4-dichlorobenzene and 1,4-dibromobenzene are particularly preferred.

The following are examples of aromatic dihlaogen compounds of formula (II) to be used according to the invention: 2,5-dichlorotoluene, 2,5-dichloroxylene, 1-ethyl-2,5-dichlorobenzene, 1,-ethyl,2,5-dibromobenzene, 1-ethyl-2-bromo-5-chlorobenzene, 1,2,4,5-tetramethyl-3,5-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene, 2,4-dichlorotoluene, 2,4-dichloroxylene, 2,4-dibromocumene, and 1-cyclohexyl-3,5-dichlorobenzene. These may be used singly or as mixtures with each other.

The following are examples of aromatic triand tetra halogen compounds of formula (III): 1,2,3-trichlorobenzene, 1,2,4-trichlorobenzene, 1,2,4-tribromobenzene, 1,3,5-trichloro-2,4,5-trimethyl benzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4-tetrachloronaphthalene, 1,2,4,5-tetrachlorobenzene, 2,3'4,4'-tetrachloro-biphenyl and 1,3,5-trichlorotriazine.

The following are examples of solvents which can be used for the reaction according to the invention:

N-methyl pyrrolidone, N-ethyl pyrrolidone, N-methyl piperidone, N-methyl caprolactam, N-ethyl caprolactam and 1,3-dimethyl imidazolidinone.

The following are examples of precipitating agents suitable for use according to the invention for working up purposes: alcohols, e.g. aliphatic alcohols such as methanol, ethanol, propanol, isopropanol, butanol, isobutanol, tertiary butanol, pentanol, hexanol and cyclohexanol; carbonyl compounds such as ketones, e.g. acetone, methylethyl ketone, methyl isopropyl ketone and methyl isobutyl ketone; also the solvents mentioned above which were previously used for the reaction.

The polyarylene sulphides may be prepared by the usual methods and are then worked up according to the invention by measures whereby the corrosive properties (e.g. splitting off and evolution of corrosive gases at elevated temperatures) of the polyarylene sulphides may be eliminated.

In the process of working up employed according to the invention after the polymerisation reaction has been carried out, the reaction mixture is introduced into a suitable diluent, e.g. a precipitation solvent (e.g. alcohol, ketone or the same solvent as that used for the polymerisation) so that the polymer is precipitated. The polymer may then be washed with a suitable washing solvent (e.g. water, alcohols or ketones). It is generally found that at the end of this procedure, no electrolytes such as inorganic salts (e.g NaCl) can be detected in the polymer.

To measure the relative corrosiveness of a polyarylene sulphide, 10 g of the polymer are melted at 320° C. and then gassed using 5 litres of air per hour. The gaseous stream is passed through water and the gases dissolved in the water are titrated at intervals of 30 minutes. Acid gases are titrated with NaOH and basic gases with HCl in the usual manner. The amount of NaOH used up is an indication of the corrosive properties of the polyarylene sulphide.

The polyarylene sulphides according to the invention may be mixed with other polymers, such as pigments, and fillers, such as graphite, metal powders, glass powder, quartz sand or glass fibres, or the usual additives for polyarylene sulphides may be added, such as conventional stabilizers or mould release agents.

The polyarylene sulphides may be processed directly by extrusion, blow extrusion, injection moulding or other conventional processing techniques to form foils, moulded articles or fibres. These end products may be used for the usual purposes, e.g. as motor car parts and fittings, electrical parts such as switches, electronic panels, chemically resistant and weather resistant parts and apparatus such as pump housings and pump impellers, dishes for etching baths, packing rings, parts of office machinery and telecommunication equipments, as well as domestic appliances, valves and parts of ball-bearings. Examples

EXAMPLE 1

1290 g of sodium sulphide trihydrate ( 10.0 mol of Na₂S), 204.1 g of sodium acetate trihydrate (15 mol %, based on Na₂S), sufficient sodium hydroxide solution to neutralize the sodium hydrogen sulphide, and 4,000 ml of N-methyl pyrrolidone are introduced into an autoclave equipped with stirrer and distillation attachment, and heated to 200° C. A liquid consisting mainly of water distils off.

1,470 g of 1,4-dichlorobenzene and 14.5 g of 1,2,4-trichlorobenzene dissolved in 500 ml of N-methyl pyrrolidone are then added and the reaction mixture is heated to 240° C. and left at this temperature for 5 hours.

After the reaction is completed, the reaction mixture is introduced into various precipitation solvents with vigorous stirring. The precipitated product is washed four times with four times its quantity of precipitation solvent and then washed free from electrolyte with water to remove residues of inorganic salts.

For comparison, the sequence of the washings was reversed (for results see Table 1). Mechanical properties are generally not affected by this method of working up.

TABLE 1

| Precipitation solvent | Second Washing solvent | Acid gases after (minutes) 30' | 60' |
|---|---|---|---|
|  |  | in ml of N/10 NaOH |  |
| Methanol | H₂O | 2.7 | 3.2 |
| Ethanol | H₂O | 3.5 | 4.9 |
| Propanol | H₂O | 3.4 | 4.9 |
| Isopropanol | H₂O | 2.5 | 3.4 |
| Acetone | H₂O | 4.0 | 5.2 |
| Methylethyl ketone | H₂O⁽¹⁾ | 4.5 | 5.4 |
| Methylisopropyl ketone | H₂O⁽¹⁾ | 4.0 | 5.1 |
| Methylisobutyl ketone | H₂O⁽¹⁾ | 4.2 | 5.3 |
| N—methyl pyrrolidone | H₂O | 2.6 | 3.9 |
| Cyclohexane | H₂O⁽¹⁾ | 5.2 | 6.9 |
| Toluene | H₂O⁽¹⁾ | 5.3 | 6.4 |
| H₂O | Acetone | 5.9 | 7.2 |
| H₂O | Isopropanol | 5.9 | 7.4 |
| H₂O | Ethanol | 5.4 | 7.0 |

⁽¹⁾the precipitation solvent was driven off with steam before the washing with water.

EXAMPLE 2

The same as Example 1 except that N-methylcaprolactam was used instead of N-methyl pyrrolidone (see Table 2).

TABLE 2

| Precipitation solvent | Second washing solvent | Acid gases after (minutes) 30' | 60' |
|---|---|---|---|
|  |  | in ml of N/10 NaOH |  |
| Methanol | H₂O | 2.9 | 3.5 |
| Ethanol | H₂O | 3.9 | 5.1 |
| Propanol | H₂O | 3.4 | 5.0 |
| Isopropanol | H₂O | 2.8 | 3.7 |
| Acetone | H₂O | 4.1 | 5.5 |
| Methylethyl ketone | H₂O⁽¹⁾ | 4.6 | 5.6 |
| Methylisopropyl ketone | H₂O⁽¹⁾ | 3.9 | 4.7 |
| Methylisobutyl ketone | H₂O⁽¹⁾ | 4.8 | 5.9 |
| N—methyl caprolactam | H₂O | 2.9 | 4.2 |
| Cyclohexane | H₂O⁽¹⁾ | 4.8 | 6.4 |
| Toluene | H₂O⁽¹⁾ | 5.1 | 6.3 |
| H₂O | Acetone | 6.1 | 7.6 |
| H₂O | Isopropanol | 5.8 | 7.1 |

TABLE 2-continued

| Precipitation solvent | Second washing solvent | Acid gases after (minutes) 30' | 60' |
|---|---|---|---|
|  |  | in ml of N/10 NaOH |  |
| H₂O | Ethanol | 5.6 | 7.3 |

⁽¹⁾the precipitation solvent was driven off with steam before the washing with water.

We claim:

1. Process for the preparation of high molecular weight polyarylene sulphide which comprises forming a reaction mixture by reacting
    (a) 50–100 mol % of aromatic dihalogen compound corresponding to the formula:

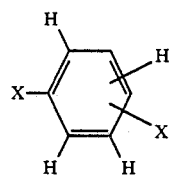

and 0–50 mol % of aromatic dihalogen compound corresponding to the formula

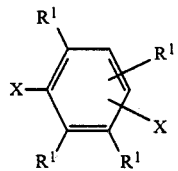

wherein
X represents halogen atoms in the meta or para position to each other,
R¹ is identical or different and is hydrogen, alkyl, cycloalkyl, aryl, alkylaryl, arylalkyl, or two groups each represented by R¹ in the ortho position to each other are linked together to form an aromatic or heterocyclic ring, and one R¹ is always other than hydrogen, and
   (b) 0 to 5 mol %, based on the sum of components (a) and (b) of an aromatic tri- or tetrahalogen compound corresponding to the formula:

ArX_n wherein
Ar represents an aromatic or heterocyclic group,
X represents chloro or bromo and
n represents the number 3 or 4, and
   (c) alkali metal sulphide or a mixture of alkali metal sulphide with alkali metal hydroxide, the molar ratio of (a+b):c lying in the range of from 0.85:1 to 1.15:1 and
   (d) an organic solvent, with the molar ratio of alkali metal sulphide (c) to the organic solvent (d) lying within the range of from 1:2 to 1:5, and
   (e) water in the form of water of hydration or free water, the molar ratio of (c):(e) lying within the range of from 1:0 to 1:3 with the process being carried out at a reaction temperature of 160° C. to 270° C.,
wherein after completion of the reaction, the reaction mixture is introduced into an organic diluent comprising a ketone whereby a polyarylene sulphide precipitate is formed and the precipitate is subsequently washed.

2. Process according to claim 1 wherein N-methyl pyrrolidone or N-methyl caprolactam is the organic solvent.

3. Process according to claim 1 wherein the organic solvent (d) contains a co-solvent.

4. Process according to claim 1 conducted in the presence of a catalyst.

5. Process according to claim 1 conducted under a pressure in excess of atmospheric.

6. Process according to claim 1 wherein the polyarylene sulphide prepared is a branched polyarylene sulphide.

7. Process according to claim 1 wherein the diluent is a ketone and the organic solvent (d) is a ketone of the same species as the diluent.

* * * * *